United States Patent [19]

Byon

[11] Patent Number: 5,702,840
[45] Date of Patent: Dec. 30, 1997

[54] VENT CAP FOR A LITHIUM BATTERY

[75] Inventor: Sung-Kwang Byon, Seoul, Rep. of Korea

[73] Assignee: Daewoo Electronics Co., Ltd., Seoul, Rep. of Korea

[21] Appl. No.: 682,086

[22] Filed: Jul. 17, 1996

[30] Foreign Application Priority Data

Dec. 22, 1995 [KR] Rep. of Korea ............... 95-54848

[51] Int. Cl.⁶ ..................... H01M 2/04; H01M 2/12
[52] U.S. Cl. ..................... 429/89; 429/53; 429/56
[58] Field of Search ..................... 429/53, 56, 82, 429/94, 175, 61, 66, 174

[56] References Cited

U.S. PATENT DOCUMENTS

| | | | |
|---|---|---|---|
| 4,345,611 | 8/1982 | Ikeda et al. | 429/56 |
| 4,783,383 | 11/1988 | Machida et al. | 429/174 |
| 4,963,446 | 10/1990 | Roels et al. | 429/94 |
| 4,971,867 | 11/1990 | Watanabe et al. | 429/61 |
| 5,344,724 | 9/1994 | Ozaki et al. | 429/94 |

OTHER PUBLICATIONS

Pistoia, editor "Lithium Batteries New Materials, Developments and Perspectives", Industrial Chemistry Library, vol. 5, Elsiver Publishing, pp. 171, 253–254. No Month, 1994.

*Primary Examiner*—Prince Willis, Jr.
*Assistant Examiner*—Carol Chaney
*Attorney, Agent, or Firm*—Beveridge, DeGrandi, Weilacher & Young, LLP

[57] ABSTRACT

A vent cap for a lithium battery which includes an electrolyte which is in electrical contact with an anode of lithium or lithium alloy and a cathode containing at least one metallic salt is disclosed. The vent cap is shaped in a hat shape and includes a projected portion having a depression at a top side of the projected portion. The plane shape of the depression is a rectangle, and a pair of vent holes are formed by cutting two sides of the depression opposite to each other.

6 Claims, 3 Drawing Sheets

VENT CAP FOR A LITHIUM BATTERY

BACKGROUND OF THE INVENTION

1. Field of the Invention

The present invention relates to a vent cap for a lithium battery, and more particularly to a vent cap for a lithium battery constructed to reduce the bursting distance of gas and flame generated in the battery when the battery burns or explodes.

2. Description of the Prior Art

Recently, a lithium battery which includes an electrolyte which is in electrical contact with an anode of lithium or lithium alloy and a cathode containing at least one metallic salt has been developed and widely utilized in various electronic devices.

However, because metal lithium has high reactivity, the temperature and pressure of the battery are apt to rise by moisture or active impurities contained in the battery.

Moreover, according to recent developments, there are increasing cases of wrong use of the battery of this kind such that the battery, despite the fact that the battery is a primary battery, is erroneously subjected to charging or forced discharging by an external power source. An example of forced discharging, which occurs many times, is that one or more old batteries, which are already used and the discharging capacity thereof is depleted or small, are connected with one or more new batteries of which the discharging capacity is plentiful. In this case, if the battery of which the discharging capacity is depleted is forced to be discharged, the battery is loaded with a minus voltage by the current supplied from the other healthy battery.

If such error occurs in a lithium battery, the battery is apt to generate heat due to an internal short circuit and there are some cases of explosion of the battery.

Besides, when the lithium batteries are subjected to work using relatively high current, the batteries generate a lot of heat and the temperature of the battery becomes higher at the central portion, and an insulation layer between positive and negative electrode plates is molten, whereby an internal short circuit occurs and a further high current flows there with the generation of further heat. Accordingly, the lithium and lithium alloy become molten and the battery burns or explodes.

In order to prevent such burning or explosion of the battery, an explosion resistant structure has been utilized for safety.

FIG. 1 illustrates a partly sectional view of the upper structure of a conventional coiled lithium battery. With reference to FIG. 1, reference numeral 1 denotes a cylindrical casing with a bottom (not shown), into which a coiled electrode body 2 is installed. Casing 1 has, at its upper portion, a narrow portion as indicated by 1a. Vent cap 3 is shaped in a hat shape and is formed of a circular flat portion 3a and a projected portion 3b projected from the central portion of flat portion 3a upwardly and disposed coaxially with flat portion 3a. Projected portion 3b is shaped in a cylindrical shape and has a first vent hole 3c formed at the central portion of the top wall of projected portion 3b and a second vent hole 3d formed at the side wall of projected portion 3b. The peripheral edge portion of flat portion 3a of vent cap 3 is clamped between narrow portion 1a and a folded upper edge portion 1b of casing 1 to expose projected portion 3b.

A positive temperature coefficient (hereinafter simply referred to as "PTC") element 4 is made of metal which has its electric resistance proportional to the temperature. When the inner temperature of the battery is over a predetermined value, PTC element 4 has very high resistance and serves as an insulator for opening the inner electric circuit of a battery. PTC element 4 has a round disk shape opened by a hole 4a at its central portion. Within the battery, PTC element 4 is laid below vent cap 3. PTC element 4, a ring plate 5, a burst disk 6 and a lower cap 7 are installed within casing 1 in this order. Ring plate 5 serves for shock-absorbing and is made of plastic in a round disk shape with its central portion opened by a hole 5a. Burst disk 6 is made of metal plate, such as aluminum plate, in a round disk shape in order to break over a predetermined value of inner pressure of the battery. Lower cap 7 has a projected portion 7a which is projected toward the bottom of casing 1. Projected portion 7a has a hole 7b at its central portion. Outer peripheral edges of ring plate 5 and burst disk 6 are clamped by a folded outer peripheral edge of lower cap 7. Vent cap 3, PTC element 4 and lower cap 7 including ring plate 5 and burst disk 6 are installed in this order and are clamped between narrow portion 1a of casing 1 and a radially inwardly folded upper edge portion 1b of casing 1 through a ring-shaped packing 9.

When the inner pressure of the battery constructed as described above rises, burst disk 6 expands upwardly. When burst disk 6 further expands, it will break to exhaust the inner gas of the battery outward through first and second vent holes 3c and 3d, thereby preventing explosion of the battery.

However, in the conventional battery structure, most of gas and flame generated are exhausted through first vent hole 3c which is located just above holes 4a, 5a and 7b and is provided at the center of vent cap 3. Accordingly, gas and flame generated from the battery burst out substantially without dispersion to attain a long distance, thereby damaging electronic devices including the battery and possibly injuring a person.

SUMMARY OF THE INVENTION

The present invention is devised to solve the foregoing problems. An object of the present invention is to provide a vent cap for a lithium battery constructed to disperse gas and flame generated during an explosion so as to reduce their bursting pressure and distance.

In order to accomplish the above object of the present invention, there is provided a vent cap for a lithium battery comprising:

a circular flat portion;

a cylindrical projected portion projected from the central portion of the flat portion upwardly and disposed coaxially with the flat portion;

a depression formed at the top side of the projected portion and having a rectangular plane shape; and a pair of vent holes formed face to face with each other by cutting two sides opposite to each other of the depression.

The vent cap may further include a blocking plate shaped in a circular disk shape and having at least one groove at its peripheral edge, the blocking plate being installed within the projected portion in parallel with the top side of the projected portion.

BRIEF DESCRIPTION OF THE DRAWINGS

The above object and other advantages of the present invention will become more apparent by describing in detail preferred embodiment thereof with reference to the attached drawings in which.

DETAILED DESCRIPTION OF THE PREFERRED EMBODIMENT

Hereinafter, the preferred embodiment of the present invention will be described in detail with reference to FIGS. 2 to 5.

Figure 1:
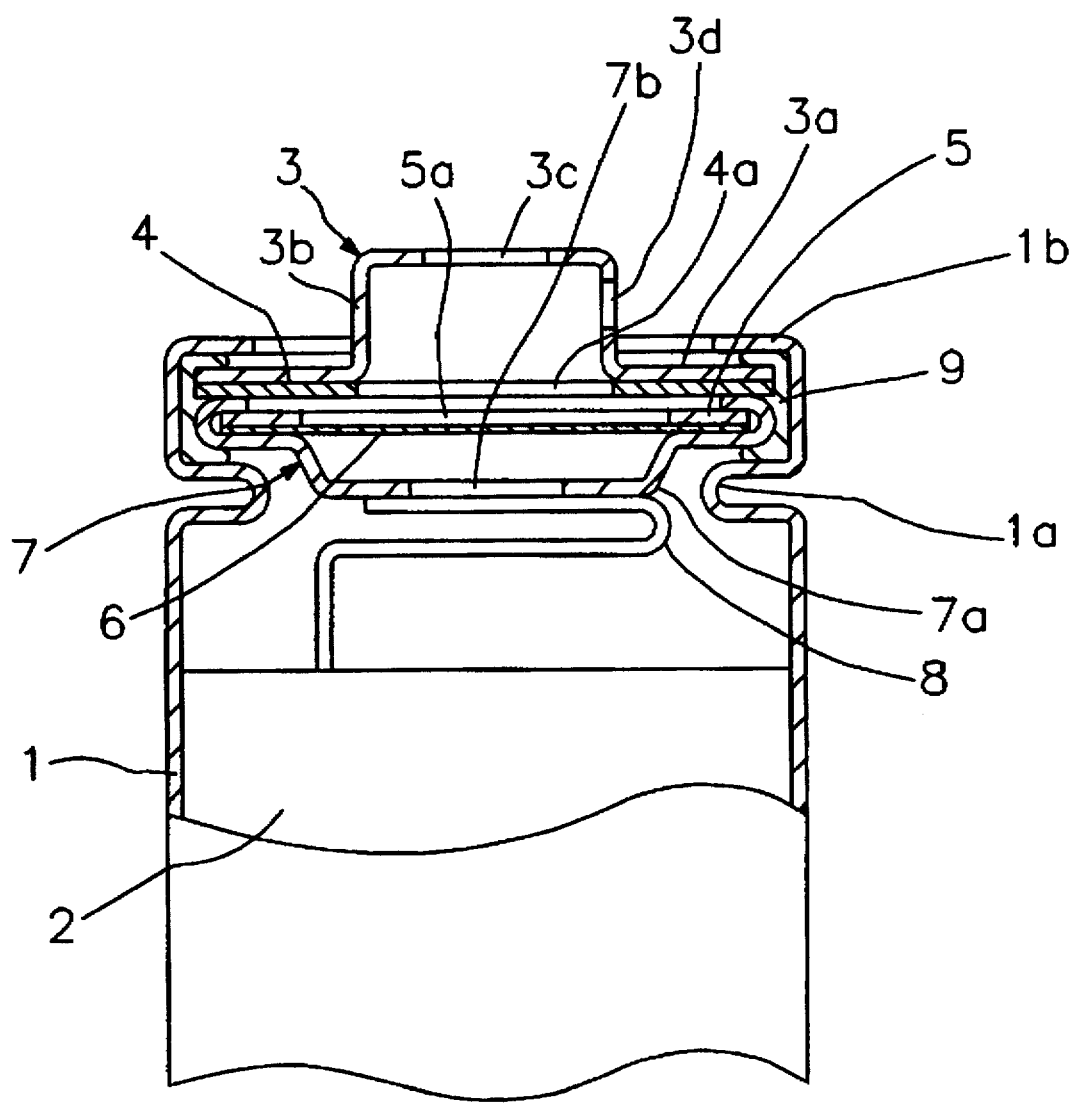
FIG. 1 is a partly vertical sectional view showing the upper structure of a conventional lithium battery.
Figure 2A:
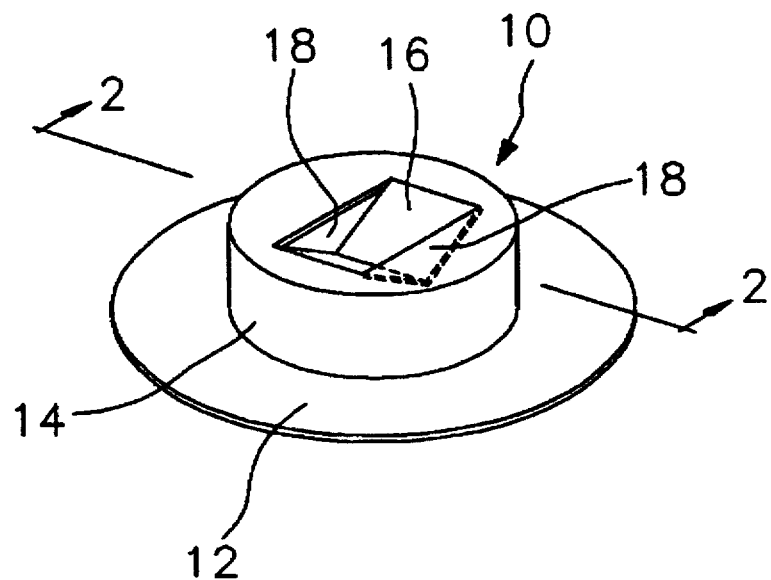
FIG. 2A is a perspective view of a vent cap for a lithium battery according to a first embodiment of the present invention.
Figure 2B:
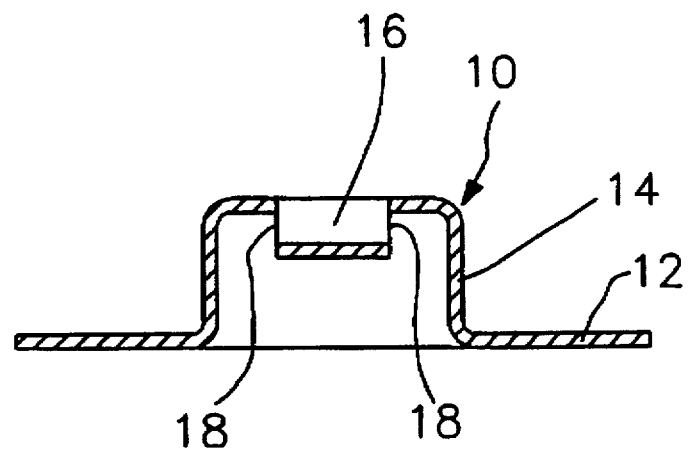
FIG. 2B is a sectional view taken along line A—A of FIG. 2A.

A vent cap 10 according to a first embodiment of the invention is shown in FIGS. 2A and 2B. FIG. 2B is a sectional view of a vent cap 10 according to the first embodiment taken along Line A—A of FIG. 2A.

Vent cap 10 is shaped in a hat shape by press forming. Vent cap 10 is formed of a circular flat portion 12 and a cylindrical projected portion 14 projected from the central portion of flat portion 12 upwardly and disposed coaxially with flat portion 12. A depression 16 which is formed of two inclined planes is provided at the top side of projected portion 14 by press forming. Two sides of depression 16 are cut on press forming, so that two triangular vent holes 18 are formed face to face with each other. In this embodiment, depression 16 is shaped in a rectangular plane shape and a v-shaped vertical-sectional shape.

Figure 3:
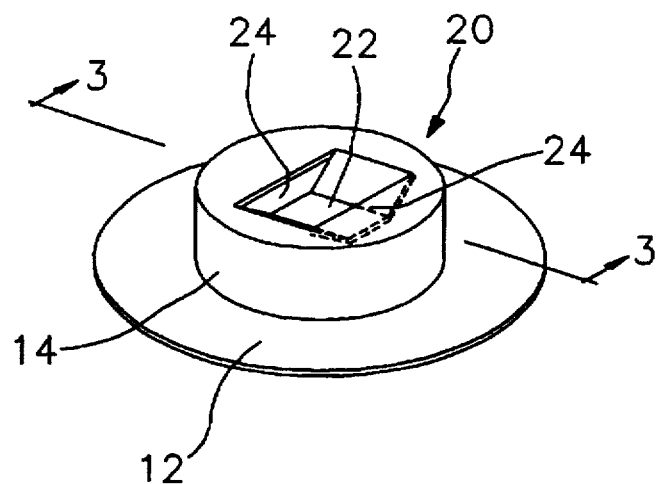
FIG. 3 is a perspective view of a vent cap for a lithium battery according to a second embodiment of the present invention.

In FIG. 3, a perspective view of a vent cap 20 is shown according to a second embodiment of the invention.

In this embodiment, the same reference numerals as the first embodiment denote the same elements, of which the explanation is omitted. A depression 22, which is formed of two inclined planes and a horizontal plane connecting two inclined planes with each other, is provided at the top side of projected portion 14 by press forming. Two sides of depression 22 are cut on press forming, so that two trapezoid vent holes 24 are formed face to face with each other. In this embodiment, depression 22 is shaped in a rectangular plane shape and a trapezoid vertical-sectional shape.

In spite of the above embodiments, a vertical-sectional shape of the depression is not especially limited and may be hemicyclic.

Figure 4:
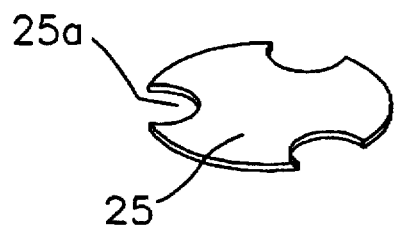
FIG. 4 is a perspective view of a blocking plate for blocking gas and flame generated within the battery.

FIG. 4 is a perspective view of a blocking plate 25 which is shaped in a circular disk shape and may be included in each embodiment in order to reduce more the bursting pressure of gas and flame generated within the battery. A plurality of grooves 25a, preferably three grooves 25a, are provided at an outer peripheral edge of blocking plate 25.

Figure 5:
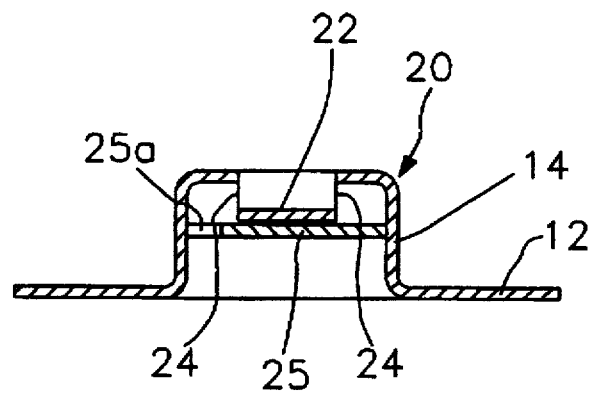
FIG. 5 is a sectional view taken along line B—B of FIG. 3 with the blocking plate shown in FIG. 4.

FIG. 5 is a sectional view of vent cap 20 shown in FIG. 3 with blocking plate 25. Blocking plate 25 is fixed within projected portion 14 substantially parallel with the top side of projected portion 14. An edge of blocking plate 25 is coupled with the inner wall of projected portion 14, so that grooves 25a serve as exhaust passages of gas and flame generated within the battery.

In the battery having the vent cap according to the invention, when gas and flame burst out by an inner explosion of the battery or gas bursts out by the rising of the inner pressure of the battery, the gas and flame first make contact with the inner wall of the depression to reduce their bursting pressure. Then, the gas and flame having reduced bursting pressure burst out dispersively through two vent holes.

If blocking plate 25 is further installed, the above blocking effect becomes higher. Gas and flame generated with the battery first make contact with blocking plate 25 to reduce their bursting pressure and then burst out through grooves 25a of blocking plate 25.

As a result, bursting distance of gas and flame is reduced to have a high degree of safety and to prevent the damage of an electronic device.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A vent cap for a lithium battery which includes an electrolyte which is in electrical contact with an anode of lithium or lithium alloy and a cathode, said vent cap comprising:

a circular flat portion; and a cylindrical projected portion projected from a central portion of said circular flat portion and disposed coaxially with said circular flat portion, said cylindrical projected portion having, at a top side thereof, a depression with a rectangular horizontal cross section, and a pair of vent holes formed face to face with each other by cutting two opposing sides of said depression.

2. The vent cap as claimed in claim 1, further comprising a blocking plate having at least one cut-out portion at its peripheral edge, said blocking plate being installed within said cylindrical projected portion in parallel with the top side of said cylindrical projected portion.

3. The vent cap as claimed in claim 1, wherein said depression has a v-shaped vertical cross section, and said vent holes have a triangular shape.

4. The vent cap as claimed in claim 1, wherein said depression and said vent holes have a trapezoid vertical-sectional shape.

5. The vent cap as claimed in claim 1, wherein said depression and said vent holes have a hemicyclic vertical-sectional shape.

6. A vent cap for a lithium battery which includes an electrolyte which is in electrical contact with an anode of lithium or lithium alloy and a cathode, said vent cap comprising:

a circular flat portion;

a cylindrical projected portion projected from a central portion of said circular flat portion and disposed coaxially with said circular flat portion, said cylindrical projected portion having, at a top side thereof, a depression with a rectangular horizontal cross section, and a pair of vent holes formed face to face with each other by cutting two opposing sides of said depression; and a blocking plate having at least one cut-out portion at its peripheral edge, said blocking plate being installed within said cylindrical projected portion in parallel with the top side of said cylindrical projected portion, wherein said depression has a v-shaped vertical cross section, and said vent holes have a triangular shape.

* * * * *